US011455121B2

(12) United States Patent
Jain et al.

(10) Patent No.: US 11,455,121 B2
(45) Date of Patent: Sep. 27, 2022

(54) SELECTING DATA NODES FOR WAN CACHING IN A HYBRID CLOUD ENVIRONMENT

(71) Applicant: International Business Machines Corporation, Armonk, NY (US)

(72) Inventors: Abhishek Jain, Baraut (IN); Sasikanth Eda, Vijayawada (IN); Sandeep Ramesh Patil, Pune (IN); Anil Laxman Palled, Pune (IN)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 16/749,135

(22) Filed: Jan. 22, 2020

(65) Prior Publication Data

US 2021/0223988 A1     Jul. 22, 2021

(51) Int. Cl.
*G06F 3/06*    (2006.01)
*G06F 16/182*  (2019.01)
*G06F 12/14*   (2006.01)

(52) U.S. Cl.
CPC ............ *G06F 3/0659* (2013.01); *G06F 3/065* (2013.01); *G06F 3/067* (2013.01); *G06F 3/0607* (2013.01); *G06F 3/0647* (2013.01); *G06F 12/1458* (2013.01); *G06F 16/182* (2019.01)

(58) Field of Classification Search
CPC .. G06F 16/182; G06F 12/1458; G06F 3/0659; G06F 3/0607; G06F 3/067; G06F 3/0617; G06F 3/0647; G06F 3/0643; G06F 3/065
See application file for complete search history.

(56) References Cited

U.S. PATENT DOCUMENTS

| | | | |
|---|---|---|---|
| 8,458,239 B2 | 6/2013 | Ananthanarayanan et al. | |
| 9,176,980 B2 | 11/2015 | Ananthanarayanan et al. | |
| 9,529,821 B2 | 12/2016 | Eshel et al. | |
| 9,678,944 B2 * | 6/2017 | Gandhi | H04L 67/10 |
| 9,727,578 B2 | 8/2017 | Eshel et al. | |
| 10,489,248 B1 * | 11/2019 | Javadekar | G06F 3/065 |
| 10,878,770 B2 * | 12/2020 | Spitzer | G09G 5/003 |
| 11,240,240 B1 * | 2/2022 | Williams | H04L 63/0846 |
| 2001/0039548 A1 * | 11/2001 | Shinkai | G06F 16/182 |
| | | | 707/999.009 |

(Continued)

OTHER PUBLICATIONS

Cachin et al., "Dependable Storage in the Intercloud," Computer Science Research Report, Switzerland, Oct. 21, 2010, 7 pages, https://ibm.ent.box.com/file/538620720934.

(Continued)

*Primary Examiner* — Etienne P Leroux
(74) *Attorney, Agent, or Firm* — Grant Johnson

(57) ABSTRACT

A computer-implemented method for storing blocks of a file in a heterogeneous environment. The method may comprise receiving a command header for an operation associated with a file from a first data node, matching the enhanced metadata with capabilities of a second data node, and generating a block layout map for the file based at least in part on the enhanced metadata and the capabilities of the second data node. The command header may include enhanced metadata associated with a file, and the enhanced metadata may comprise a type of workload that generated the file and a data access pattern.

20 Claims, 10 Drawing Sheets

(56) References Cited

U.S. PATENT DOCUMENTS

| | | | |
|---|---|---|---|
| 2007/0255822 A1* | 11/2007 | Thiel | H04L 67/06 709/224 |
| 2007/0288926 A1* | 12/2007 | Kelly | G06F 11/3409 718/100 |
| 2009/0172708 A1* | 7/2009 | Cho | G06F 9/45537 719/328 |
| 2011/0239195 A1* | 9/2011 | Lin | G06F 8/71 717/126 |
| 2012/0221610 A1* | 8/2012 | Murphy | G06F 16/68 707/827 |
| 2012/0254594 A1* | 10/2012 | Hall | G06F 9/30189 712/205 |
| 2012/0284229 A1 | 11/2012 | Kim et al. | |
| 2014/0095459 A1* | 4/2014 | Eshel | G06F 16/2308 707/703 |
| 2014/0379722 A1 | 12/2014 | Mysur et al. | |
| 2016/0248841 A1* | 8/2016 | Barajas Gonzalez | G06F 3/067 |
| 2016/0381136 A1* | 12/2016 | Li | G06F 9/5077 709/226 |
| 2017/0149893 A1 | 5/2017 | Wu et al. | |
| 2018/0121285 A1* | 5/2018 | Olds | G06F 3/0613 |
| 2019/0018870 A1 | 1/2019 | Bhagwat et al. | |
| 2019/0180003 A1* | 6/2019 | Schultz | G06F 21/6218 |
| 2019/0220319 A1* | 7/2019 | Parees | G06F 9/5027 |
| 2020/0106672 A1* | 4/2020 | Dubey | H04L 41/082 |
| 2020/0167196 A1* | 5/2020 | Smith | H04L 49/70 |
| 2021/0067420 A1* | 3/2021 | Kidd | H04W 76/12 |
| 2021/0342163 A1* | 11/2021 | Ocak | G06F 9/4416 |

OTHER PUBLICATIONS

Hafner et al., "Performance Metrics for Erasure Codes in Storage Systems," IBM Research Report, Computer Science, California, Aug. 2, 2004, 65 pages, https://ibm.ent.box.com/file/538632567881.

Hafner et al., "Matrix Methods for Lost Data Reconstruction in Erasure Codes," ResearchGate, IBM Almaden Research Center, FAST '05: 4th USENIX Conference on File and Storage Technologies, Dec. 2005, 15 pages Matrix_Methods_for_Lost_Data_Reconstruction_in_Era.pdf.

Eshel et al., "Panache: A Parallel File System Cache for Global File Access," IBM Almaden Research, Printed Oct. 21, 2019, 14 pages, https://www.usenix.org/legacy/event/fast10/tech/full_papers/eshel.pdf.

Haynes, "Network File System (NFS) Version 4 Minor Version 2 Protocol," Internet Engineering Task Force (IETF), Nov. 2016, ISSN: 2070-1721, 104 pages, https://tools.ietf.org/html/rfc7862.

"GPFS Architecture," IBM, IBM Knowledge Center, Printed Nov. 6, 2019, 4 pages https://www.ibm.com/support/knowledgecenter/en/STXKQY_5.0.3/com.ibm.spectrum.scale.v5r03.doc/bl1ins_architr.htm.

Jain et al., "GPFS-SNC: An enterprise cluster file system for Big Data," IEEE Xplore Digital Library, Abstract Only, IBM Journal of Research and Development, vol. 57, Issue: 3/4, May 17, 2013, pp. 5:1-5:10, DOI: 10.1147/JRD.2013.2243531, https://ieeexplore.ieee.org/abstract/document/6517331/.

"Introduction to Active File Management (AFM)," IBM, IBM Knowledge Center, Printed Nov. 6, 2019, 5 pages https://www.ibm.com/support/knowledgecenter/STXKQY_5.0.0/com.ibm.spectrum.scale.v5r00.doc/bl1ins_introafm.htm.

"Cache and Home," IBM, IBM Knowledge Center, Printed Nov. 6, 2019, 4 pages https://www.ibm.com/support/knowledgecenter/STXKQY_5.0.0/com.IBM.spectrum.scale.v5r00.doc/bl1ins_cacheandhomeAFM.htm.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

SELECTING DATA NODES FOR WAN CACHING IN A HYBRID CLOUD ENVIRONMENT

BACKGROUND

Aspects of the present disclosure relate a method of storing and accessing files based in a client/server architecture, and more particularly, to a method for selecting data nodes to provide block layout to client based on workload type in a hybrid cloud WAN caching environment.

In distributed file systems, one or more central servers store files that can be accessed, with proper authorization rights, by any number of remote clients in the network. Much like an operating system organizes files in a hierarchical file management system, distributed systems use a uniform naming convention and a mapping scheme to keep track of where files are located.

Distributed file systems can be advantageous because they make it easier to distribute documents to multiple clients and they provide a centralized storage system so that client machines are not using their resources to store files.

SUMMARY

According to one or more embodiments, a computer-implemented method for storing blocks of a file in a heterogeneous environment. The method may comprise receiving a command header for an operation associated with a file from a first data node, matching the enhanced metadata with capabilities of a second data node, and generating a block layout map for the file based at least in part on the enhanced metadata and the capabilities of the second data node. The command header may include enhanced metadata associated with a file, and the enhanced metadata may comprise a type of workload that generated the file and a data access pattern.

According to one or more embodiments, a computer-implemented method for automatically selecting a data node in a distributed storage network based on data replication request. The method may comprise identifying a current hardware configuration of a data node, dynamically updating a metadata nodes with the current hardware configuration, receiving credentials for a remote data node to read a local file, and writing the file to the remote data node. The hardware configuration may include a memory type, a memory amount, a storage type, and available coprocessors. The remote data node is selected based at least in part a workload hardware configuration requirement associated with the file.

According to one or more embodiments, a distributed cluster file system that may comprise a first plurality of data nodes associated with a local cloud, a second plurality of data nodes associated with a remote cloud, and a metadata server. The metadata server may be adapted to receive a command header for an operation associated with a file from one of the first plurality of data nodes, match the enhanced metadata with capabilities of one or more of the second plurality of data nodes; and generate a block layout map for the file based at least in part on the enhanced metadata and the capabilities of the second data node. The command header may include enhanced metadata associated with a file, and the enhanced metadata may comprise a type of workload that generated the file and a data access pattern.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
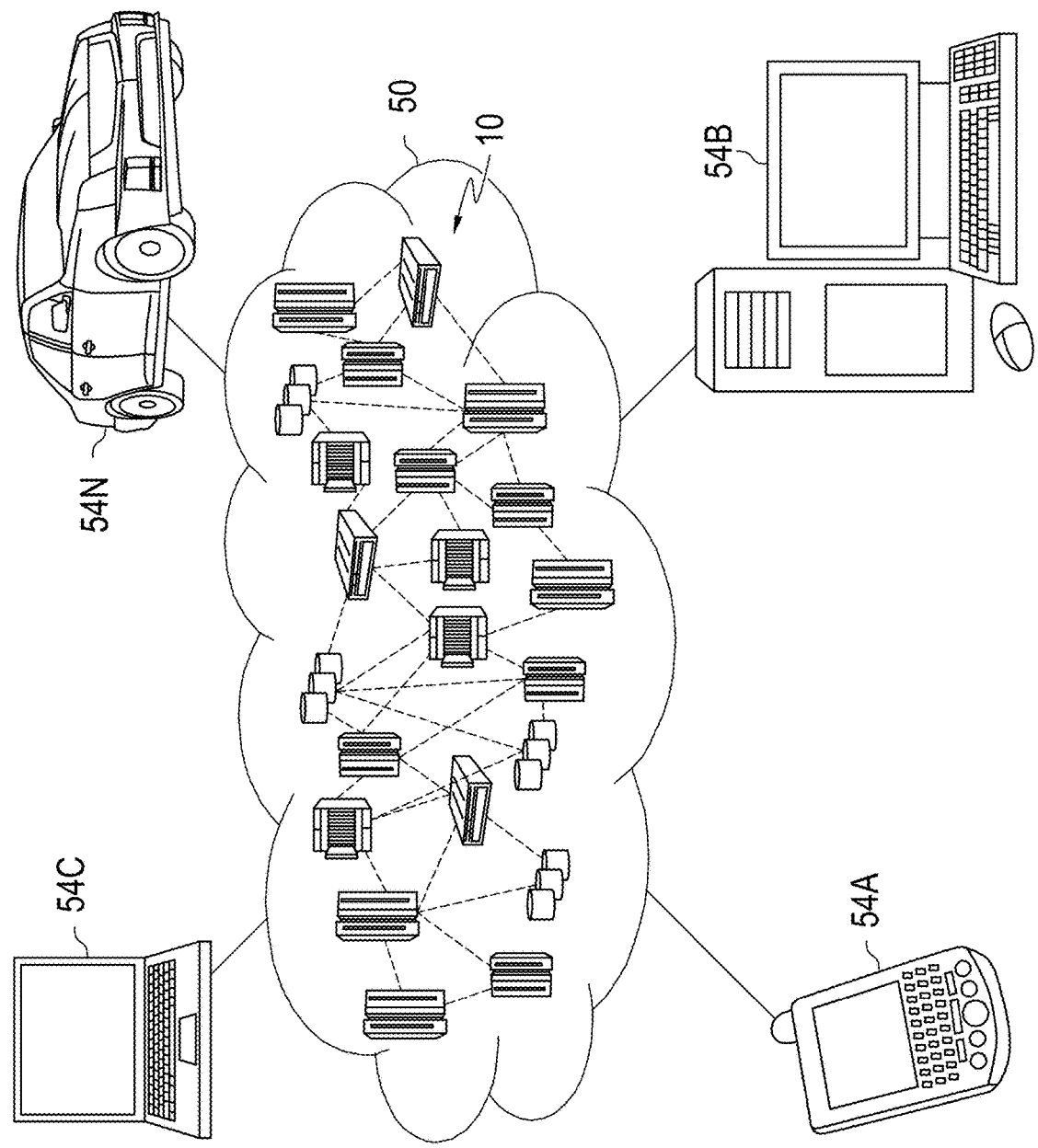
FIG. 1 depicts a cloud computing environment consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate a method of storing and accessing files based in a client/server architecture, and more particularly, to a method for selecting data nodes to provide block layout to client based on workload type in a hybrid cloud WAN caching environment. While the present disclosure is not necessarily limited to such applications, various aspects of the disclosure may be appreciated through a discussion of various examples using this context.

Hybrid cloud computing can provide significant advantages for many enterprise, particularly those hesitant about sending some or all their proprietary data off premises due to security or management concerns. In a hybrid cloud environment, network transfer protocols like pNFS can be used for data transfer between sites, where pNFS client can be configured on primary site and pNFS metadata servers to serve the client request and data server to store the data on secondary site. When the client device retrieves a file from the server, the file appears as a normal file on the client machine, and the user is able to work with the file in the same ways as if it were stored locally on their local workstation. When the user finishes working with the file, it is returned over the network to the server, which stores the now-altered file for retrieval at a later time.

In some pNFS implementations, when a pNFS client wants to access a file, it first queries to metadata server for the file's block map to where data is stored with credentials regarding its rights to read, modify, and write on that data node. Once client get block range map of file components, the client communicates directly to the storage devices in round robin fashion while accessing the data.

Now, consider a more complex scenario, where a secondary site is configured based on shared nothing cluster (SNC) architecture on cloud and where metadata/data nodes can be compute instances, such as virtual machines (VMs), whose configuration (e.g., CPU, memory, storage type, access to special purpose hardware) can be changed dynamically depending on workloads and/or on an as-need basis. However, in many such scenarios, it has been observed that only few data nodes in the cluster are configured with special purpose hardware units, such as graphical processing units (GPUs), a solid state storage device (SSD) such as a NVMe device, or a co-processor or microcontroller for catering to a special workload requirement. Similarly, only some nodes may have a particular software or OS configuration. In these scenarios, data nodes that are configured with the special purpose hardware or special software/OS configuration may be used for workloads which do not require these special configuration and vice versa. This, in turn, may unnecessary increase the cost of such workloads, as well as reduce service quality on those workloads that needed the special purpose hardware.

Accordingly, some embodiments of the invention provide a node selection mechanism and framework for a storage metadata server (e.g., pNFS) based on workload type, which in turn, may support a method to identify data nodes based on hardware configuration (with or without special purpose hardware) and then assign a block map of file to a storage client (e.g., pNFS) based on the file's workload type in hybrid cloud WAN caching environment. In this way, data can be placed or migrated on the appropriately data node for future big data operation or artificial intelligence/machine learning style data analytics without migrating data later between data nodes.

Some embodiments may influence a node selection mechanism for storing blocks of a given file based on the file's workload type in heterogenous hardware or software/OS configuration (e.g., hybrid cloud) sync/async data replication environment. In some embodiments, a secondary site storage server is adapted to support dynamic creation of a file's block layout to access/store data on different hardware configuration type data nodes based on the specific workload type and data access patterns included in a pNFS client request from primary site. In some embodiments, the storage client maintains the same relationships in reverse transfer.

Some embodiments include a framework to dynamically identify a data node's hardware configuration and update to file/metadata nodes with their current state. Some embodiments include a method to identify data migration between data nodes dynamically and place data based on file's type requirement of hardware configuration on data nodes. In some embodiments, a block aggregation layout can be performed based on the required application workload's performance demand. For example, a certain file could be split into ten blocks every time, and according to above mentioned node selection mechanism and application workload requirement for special hardware only found on five of those nodes, then two blocks per nodes will be stored. But, if an application demands more performance, then four blocks may be stored in one node and rest can be equally distributed across other nodes.

Cloud Computing

FIG. 1 illustrates an embodiment of a cloud environment suitable for use with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
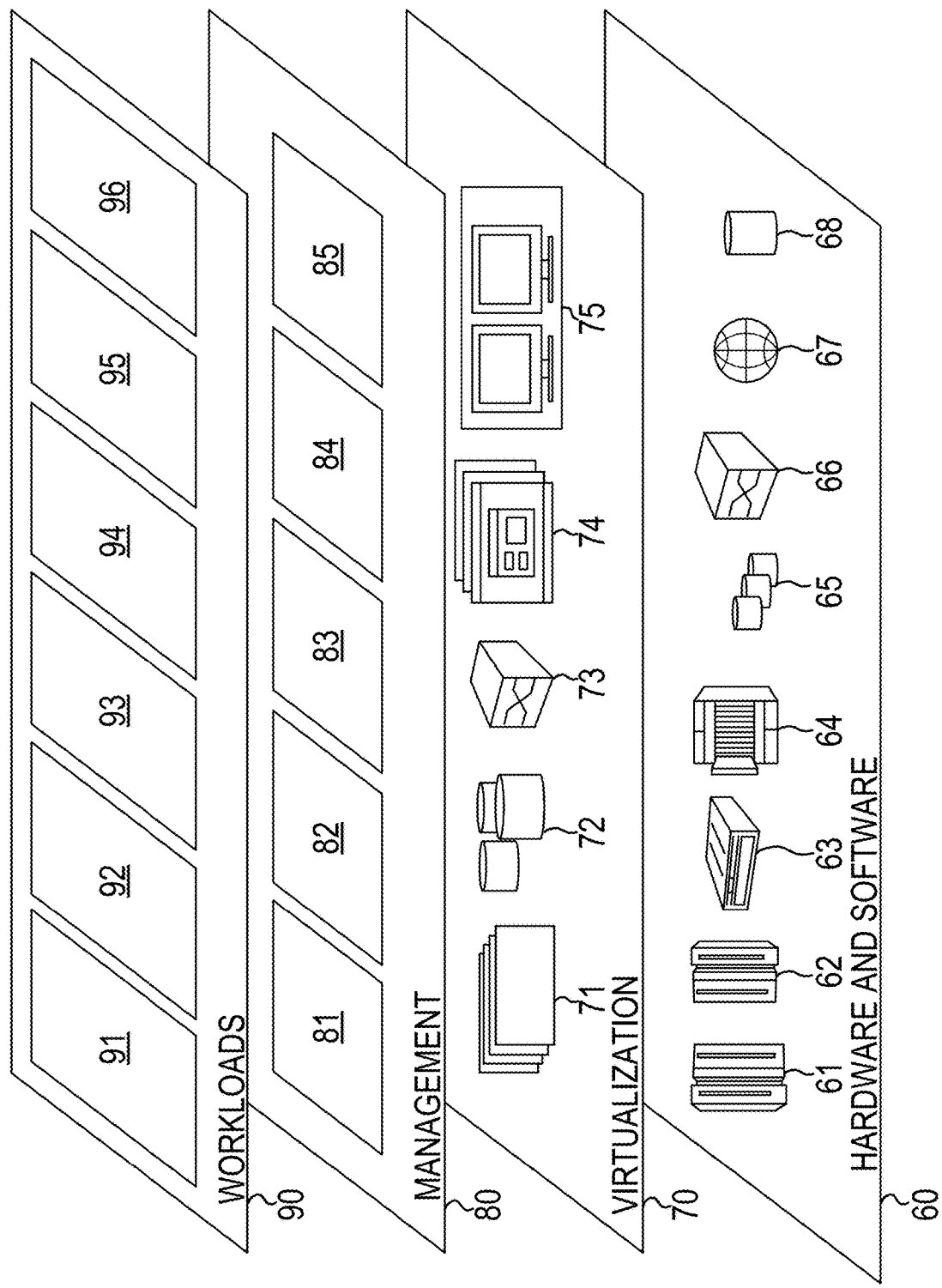
FIG. 2 depicts abstraction model layers consistent with some embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and caching cluster file system 96.

Data Processing System

Figure 3:
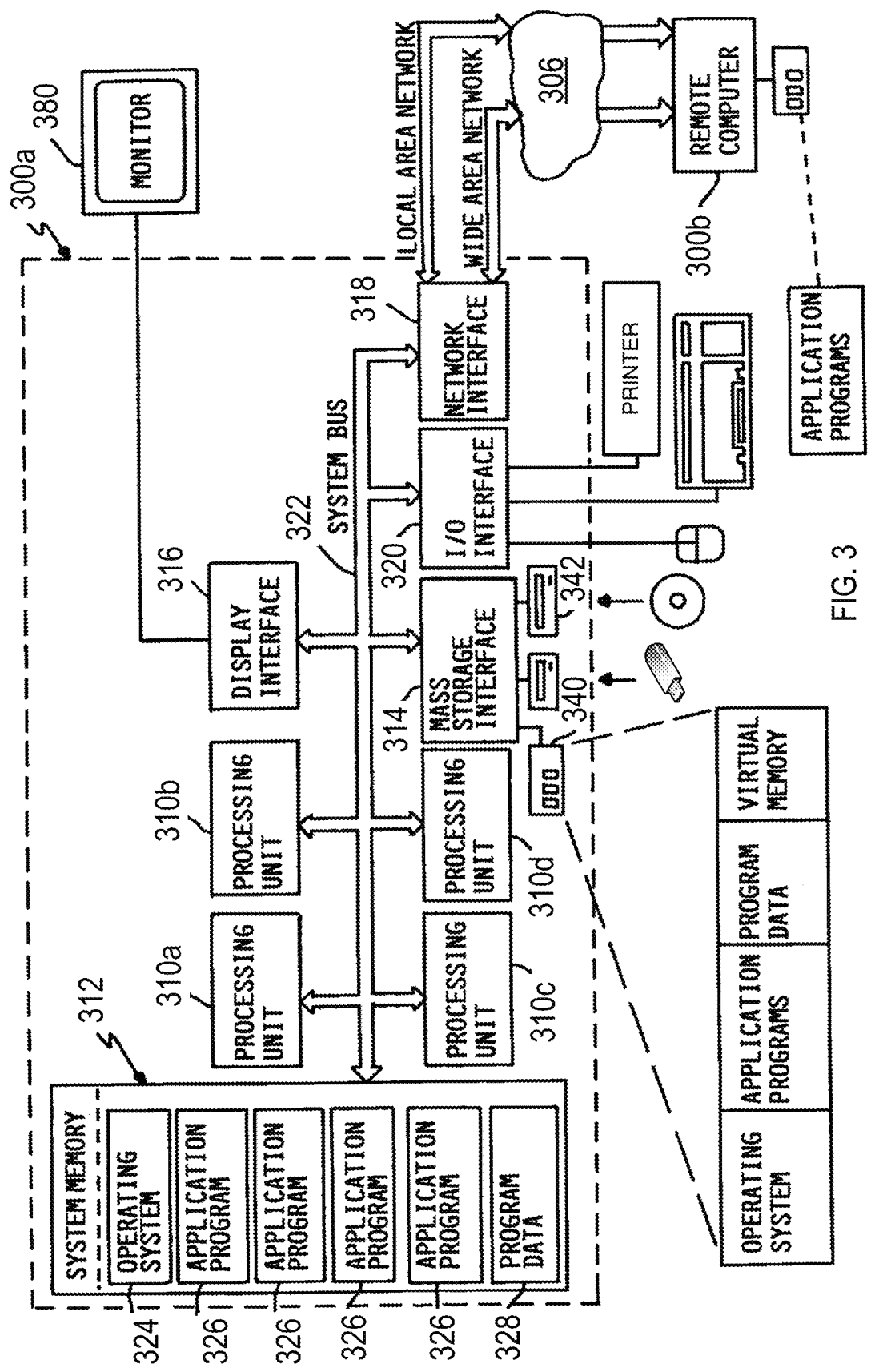
FIG. 3 is a block diagram of a data processing system (DPS) consistent with some embodiments.

FIG. 3 illustrates an embodiment of a data processing system (DPS) 300 suitable for use in a cloud environment. In some embodiments, the DPS 300 is implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 3 may be present, and that the number, type, and configuration of such components may vary. Moreover, FIG. 3 only depicts the representative major components of the DPS 300, and individual components may have greater complexity than represented in FIG. 3.

The data processing system 300 in FIG. 3 comprises a plurality of central processing units 310 a-310 d (herein generically referred to as a processor 310 or a CPU 310) connected to a memory 312, a mass storage interface 314, a terminal/display interface 316, a network interface 318, and an input/output ("I/O") interface 320 by a system bus 322. The mass storage interface 314 in this embodiment connect the system bus 322 to one or more mass storage devices, such as a direct access storage device 340 or a readable/writable optical disk drive 342. The network interfaces 318 allow the DPS 300 to communicate with other DPS 300 over the communications medium 306. The memory 312 also contains an operating system 324, a plurality of application programs 326, and program data 328.

The data processing system 300 embodiment in FIG. 3 is a general-purpose computing device. Accordingly, the processors 310 may be any device capable of executing program instructions stored in the memory 312 and may themselves be constructed from one or more microprocessors and/or integrated circuits. In this embodiment, the DPS 300 contains multiple processors and/or processing cores, as is typical of larger, more capable computer systems; however, in other embodiments the computing systems 300 may comprise a single processor system and/or a single processor designed to emulate a multiprocessor system. Further, the processors 310 may be implemented using a number of heterogeneous data processing systems 300 in which a main processor is present with secondary processors on a single chip. As another illustrative example, the processor 310 may be a symmetric multi-processor system containing multiple processors of the same type.

When the data processing system 300 starts up, the associated processor(s) 310 initially execute the program instructions that make up the operating system 324, which manages the physical and logical resources of the DPS 300. These resources include the memory 312, the mass storage interface 314, the terminal/display interface 316, the network interface 318, and the system bus 322. As with the processor(s) 310, some DPS 300 embodiments may utilize multiple system interfaces 314, 316, 318, 320, and busses 322, which in turn, may each include their own separate, fully programmed microprocessors.

Instructions for the operating system, applications and/or programs (generically referred to as "program code," "computer usable program code," or "computer readable program code") may be initially located in the mass storage devices 340, 342, which are in communication with the processors 310 through the system bus 322. The program code in the different embodiments may be embodied on different physical or tangible computer readable media, such as the system unit 312 or the mass storage devices 340, 342. In the illustrative example in FIG. 3, the instructions are stored in a functional form of persistent storage on the direct access storage device 340. These instructions are then loaded into the memory 312 for execution by the processor 310. However, the program code may also be located in a functional form on the computer readable media 342 that is selectively removable and may be loaded onto or transferred to the DPS 300 for execution by the processor 310.

The system bus 322 may be any device that facilitates communication between and among the processors 310; the memory 312; and the interfaces 314, 316, 318, 320. Moreover, although the system bus 322 in this embodiment is a relatively simple, single bus structure that provides a direct communication path among the system bus 322, other bus structures are consistent with the present disclosure, including without limitation, point-to-point links in hierarchical, star or web configurations, multiple hierarchical buses, parallel and redundant paths, etc.

The memory 312 and the mass storage devices 340, 342 work cooperatively to store the operating system 324, the application programs 326, and the program data 328. In this embodiment, the memory 312 is a random-access semiconductor device capable of storing data and programs. Although FIG. 3 conceptually depicts that device as a single monolithic entity, the memory 312 in some embodiments may be a more complex arrangement, such as a hierarchy of caches and other memory devices. For example, the memory 312 may exist in multiple levels of caches, and these caches may be further divided by function, so that one cache holds instructions while another holds non-instruction data, which is used by the processor or processors. Memory 312 may be further distributed and associated with different processors 310 or sets of processors 310, as is known in any of various so-called non-uniform memory access (NUMA) computer architectures. Moreover, some embodiments may utilize virtual addressing mechanisms that allow the DPS 300 to behave as if it has access to a large, single storage entity instead of access to multiple, smaller storage entities such as the memory 312 and the mass storage device 340, 342.

Although the operating system 324, the application programs 326, and the program data 328 are illustrated as being contained within the memory 312, some or all of them may be physically located on different computer systems and may be accessed remotely, e.g., via the communications medium 306, in some embodiments. Thus, while the operating system 324, the application programs 326, and the program data 328 are illustrated as being contained within the memory 312, these elements are not necessarily all completely contained in the same physical device at the same time and may even reside in the virtual memory of other DPS 300.

The system interface units 314, 316, 318, 320 support communication with a variety of storage and I/O devices. The mass storage interface 314 supports the attachment of one or more mass storage devices 340, 342, which are typically rotating magnetic disk drive storage devices, a solid-state storage device (SSD) that uses integrated circuit assemblies as memory to store data persistently, typically using flash memory, or a combination of the two. However, the mass storage devices 340, 342 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 316 is used to directly connect one or more display units, such as monitor 380, to the data processing system 300. These display units 380 may be non-intelligent (i.e., dumb) terminals, such as an LED monitor, or may themselves be fully programmable workstations used to allow IT administrators and users to communicate with the DPS 300. Note, however, that while the display interface 316 is provided to support communication with one or more display units 380, the computer systems 300 does not necessarily require a display unit 380 because all needed interaction with users and other processes may occur via network interface 318.

The communications medium 306 may be any suitable network or combination of networks and may support any appropriate protocol suitable for communication of data and/or code to/from multiple DPS 300. Accordingly, the network interfaces 318 can be any device that facilitates such communication, regardless of whether the network connection is made using present day analog and/or digital techniques or via some networking mechanism of the future. Suitable communication media 306 include, but are not limited to, networks implemented using one or more of the "Infiniband" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communication medium 306. The Transmission Control Protocol/Internet Protocol ("TCP/IP") suite contains suitable network and transport protocols.

Caching Cluster File System

Some embodiments provide a caching cluster file system that implements caching of remote file data in a cluster file system. The system caches data on-demand, while guaranteeing well defined file system consistency semantics. Some embodiments provide a scalable cache architecture for a cache in a file system to cache remote file system data while providing the consistency semantics of a distributed file system. The scalable caching architecture enables the file system to cache remote file system data wherein the cache can scale in capacity and bandwidth similar to a clustered file system. Further, such a cache can support a remote server file system from different vendors. The cached data can be exported and accessed transparently by a file system client for both read and write access. The cache utilizes open, standard protocols for over-the-wire file access. Further the cache can significantly mask network latency and continue to function with network outages.

In an example embodiment described below, the scalable caching architecture is integrated with an IBM® General Parallel File System™ (GPFS) clustered file system, available from International Business Machines of Armonk, N.Y. The remote data is accessed over a network file system (NFS) so that any remote server exporting data over NFS can be the caching target. To get better performance, the cache can switch to a parallel NFS (pNFS) system for data transfer if the remote system exports the data using pNFS. The cache is visible to any file system client as a Portable Operating System Interface (POSIX) compliant file system, thus any file system client can browse the cache and access the data as if it was in a local file system. The cached data can be further exported via NFS to a remote NFS client. NFS can also be substituted by the CIFS (Common Internet file system) protocol.

A Parallel Network File System (pNFS), in turn, is a standardized parallel file access protocol extension of Network File System (NFS) protocol. pNFS is expected to be supported in most scale out storage systems in the future. pNFS, an integral part of NFSv4.1 and NFSv4.2, transforms NFSv4 into a heterogeneous metadata protocol. pNFS clients and servers are responsible for control and file management operations, but delegate I/O functionality to a storage-specific layout driver on the client. pNFS clients can fully saturate the available bandwidth of the parallel file system by separating control and data flows. Each storage system may support pNFS or any similar parallel file access protocols in different ways. For example, to determine a specific file layout for I/O access, each storage system will have unique ways of creating an optimal layout to reduce latency and maximize I/O throughput.

Figure 4:
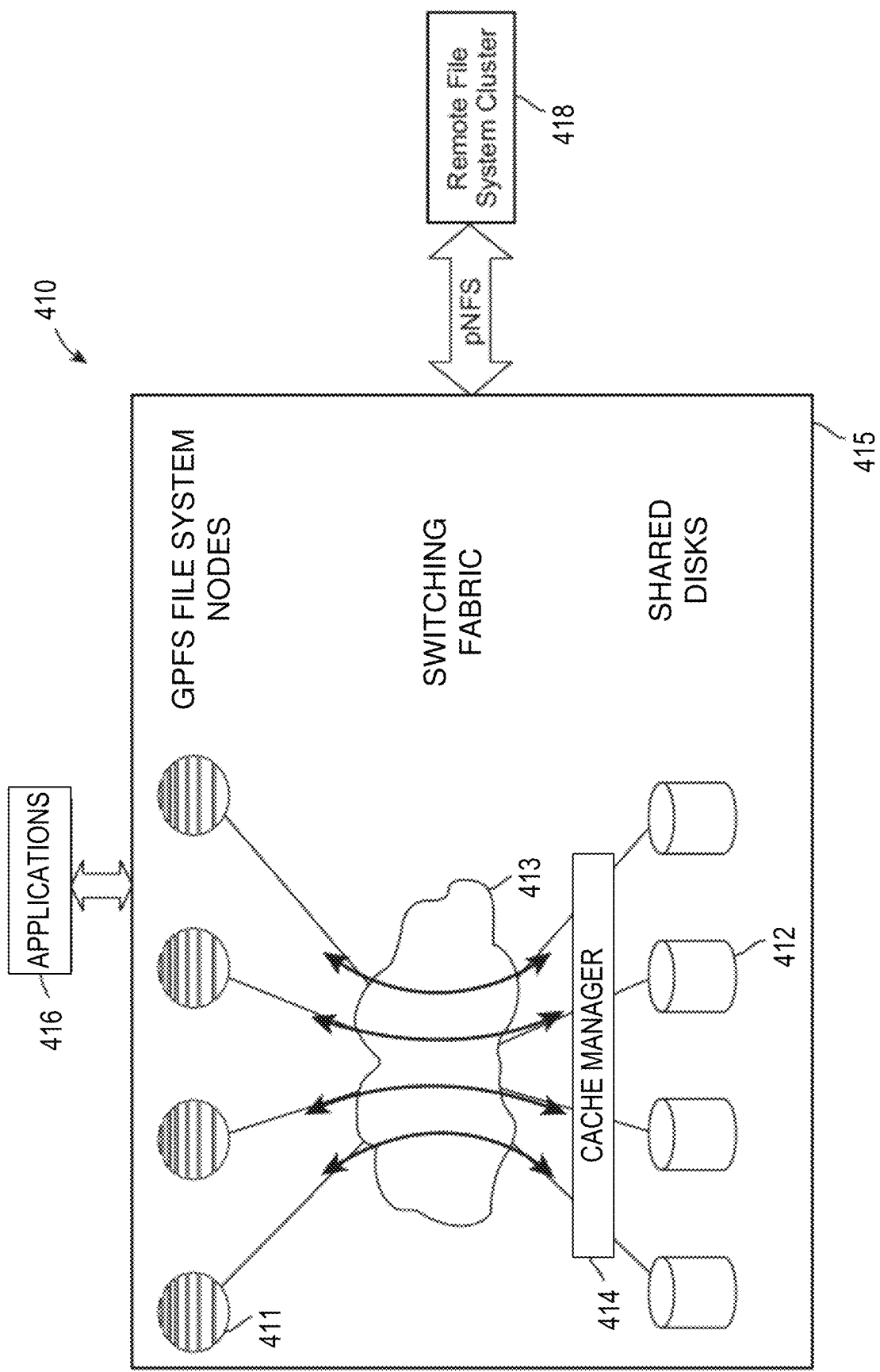
FIG. 4 depicts a scalable caching architecture consistent with some embodiments.

Referring to FIG. 4, a GPFS parallel cluster file system 410 comprising a local cached file system cluster 415 that stores cached data is depicted, consistent with some embodiments, wherein pNFS is used to move the data between the cluster 415 and a remote cluster file system 418. GPFS is used for both file system clusters 415 and 418, to provide concurrent high-speed file access across multiple file system computing nodes of a cluster. The cached cluster includes the file system 415, computing nodes 411 (e.g., processors) that support the GPFS file system and the applications 416 that use it. The nodes 411 are connected to storage media 412, such as shared disks or disk subsystems, over a switching fabric 413. A cache manager 414 maintains cached data in the storage media 12. All nodes 11 in the cluster have equal access to all disk 412. Files are striped across all disks 412 in the file system where the number of disks 412 can range from tens to several thousand disks. In addition to balancing the load on the disks, striping achieves the full throughput that a disk subsystem is capable of by reading and writing the blocks in parallel.

The switching fabric 413 that connects file system nodes 411 to the shared disks 12 may comprise a storage area network (SAN) such as fiber channel or iSCSI. Alternatively, individual disks 412 may be attached to some number of I/O server nodes that allow access from file system nodes 411 through a software layer running over a general-purpose communication network, such as IBM Virtual Shared Disk (VSD). Regardless of how shared disks 412 are implemented, the GPFS only assumes a conventional block I/O interface with no particular intelligence at the disks 413. Parallel read-write disk accesses from multiple nodes 11 in the cluster 415 are synchronized to prevent corruption of both user data and file system metadata. The cluster 415 uses distributed locking to synchronize access to shared disks 412. Wherein distributed locking protocols ensure file system consistency regardless of the number of nodes 411 that simultaneously read from and write to a file system on the disks 412 on behalf of an application 416, while at the same time allowing data migration parallelism to achieve maximum throughput.

For remote accesses over a wide area network (WAN), pNFS clients access storage devices in a remote cluster file system in parallel. This is achieved by separating the data and metadata paths, and by moving the metadata server out of the data path. As a result, each pNFS client can leverage the full aggregate bandwidth of the cluster file system. Using pNFS, clients can query the metadata server to determine the layout of how files are distributed across data servers. Layouts are maintained internally by the metadata server. Based on the file layout, the client is able to directly access the data servers in parallel. A pNFS client communicates with the data servers using a variety of storage access protocols, including NFSv4 and iSCSI/Fiber Channel. The pNFS specification allows for the addition of new layout distributions and storage access protocols, in addition to flexibility for implementation of the back-end storage system.

Figure 5:
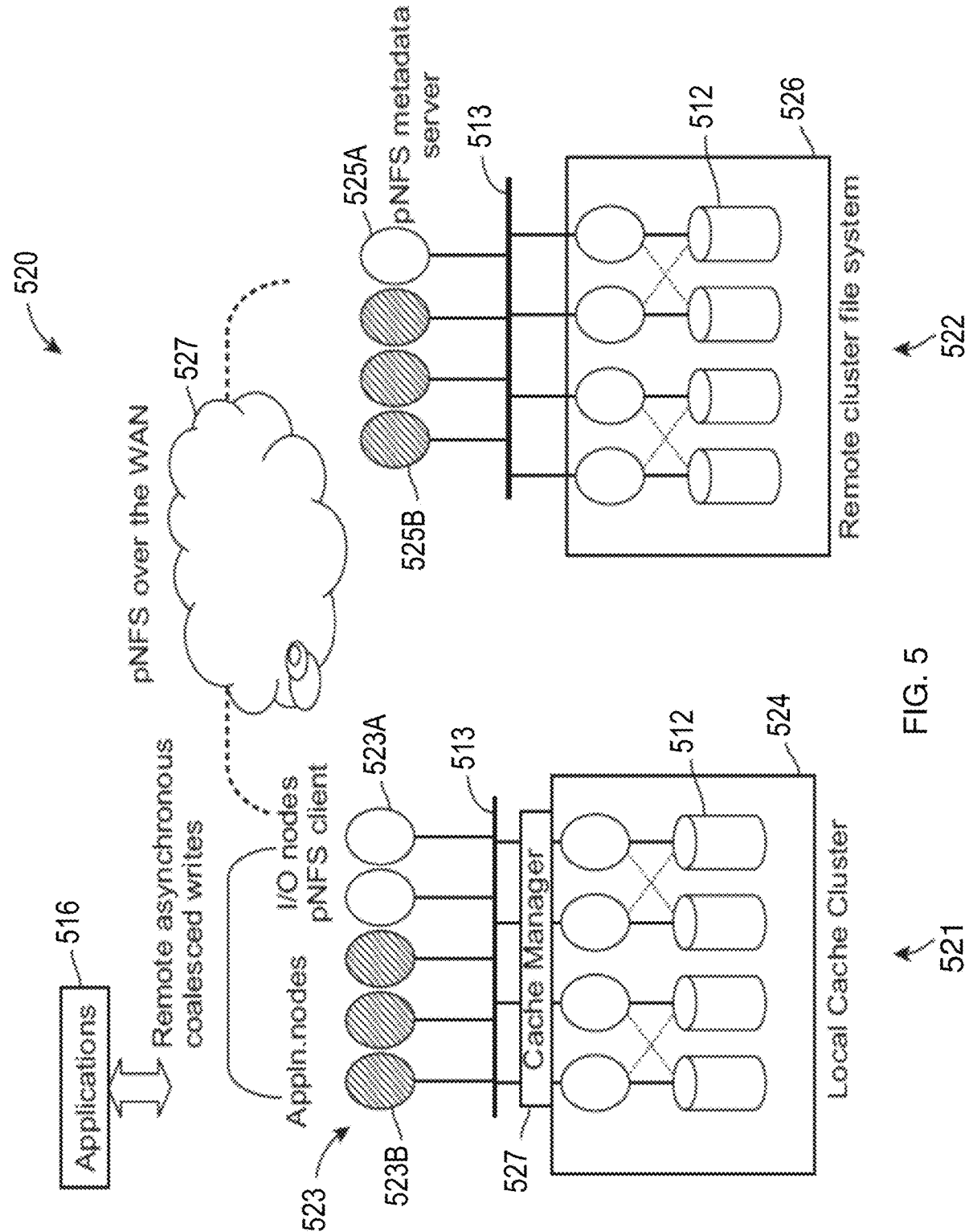
FIG. 5 depicts a functional block diagram of an information technology system consistent with some embodiments.

FIG. 5 shows a functional block diagram of an IT system 520 consistent with some embodiments. The IT system 520 includes a local cache cluster 521 and a remote cluster file system 522. Every computing node 523 in the cache cluster 521 has the same access to data cached by a local cache file system 524 of the local cache cluster 521. However, only some of the nodes 523 (i.e., I/O nodes 23A) may have the hardware and software support for remote network connectivity. I/O nodes are also called gateway nodes. The I/O nodes 523A act as pNFS clients to fetch the data from the remote cluster 521. The remote cluster 521 may store the data in any POSIX-compliant cluster file system that is exported via pNFS (NFS may also be used but with a performance penalty). The I/O nodes 523A are responsible for reading the data from the remote cluster 521 and writing it to the local cache file system 524 and vice-versa. The other nodes of the cluster (i.e., application nodes 523B) service file access requests of applications 516, by reading and writing the cached data in the local cache file system (i.e., cache) 524. The remote file system 522 similarly includes I/O nodes 525A and application nodes 525B.

The application nodes 523B of the local cache file system 521 are also responsible for forwarding access requests by requesting applications 516 to the I/O nodes 523A (i.e., writes to be synchronized with a remote server node 525A of the remote file system 521, and reads to be fetched from the remote server 525A on a local cache miss).

The split between I/O and application nodes 523A, 523B in the local system 521 is conceptual and any node 523 in the local cluster 521 can function both as an I/O node or an application node based on its configuration. The I/O nodes 523A can be viewed as the edge of the cluster cloud that can communicate with the remote cluster 522 while the application nodes 523B interface with the applications.

To access the remote data consistently, the system 520 associates a cache state with every object in the local cache file system 524, wherein the cache state includes the NFS file handle and inode (e.g., data structure) attributes of the corresponding object in the remote file system 26. As multiple nodes 523 in the local system 521 can be accessing the cached data in the local cached file system 524, the accesses may be serialized by a standard GPFS distributed lock management with one of the nodes 523 being the token manager and issuing read and write tokens. The data can be concurrently written at the remote file system 526 of the remote cluster 522, and at the local cache file system 524 of the local cache cluster 521. Between the remote cluster 522 and the local cache cluster 521, the system 520 supports the well-known close-to-open consistency guarantees provided by NFS. To reduce the frequent checking of cached attributes with the remote file system 526, the I/O nodes 523A leverage the read and write delegation support of NFSv4. With delegations, the pNFS server 525A of the remote cluster 522 can transfer the ownership of a file to the local cache cluster 521, so that the local cache cluster 521 can safely assume that the data is valid and service local requests.

A cache manager 527 integrated into local cache file system 524 intercepts the application file access requests, wherein the applications simply experience the local cache file system 524 as a traditional GPFS file system. The cache manager 527 of the local cluster 521 mimics the same namespace as the remote cluster 522. Thus, browsing through the cache cluster 521 will show the same listing of directories and files as the remote cluster 522. The caching function can be further exported via NFS to enable access by NFS clients. Example file system operations are now described, including Open/Close operations, Data Read operations and Data Write operations.

Hybrid Cloud Environment

Figure 6:
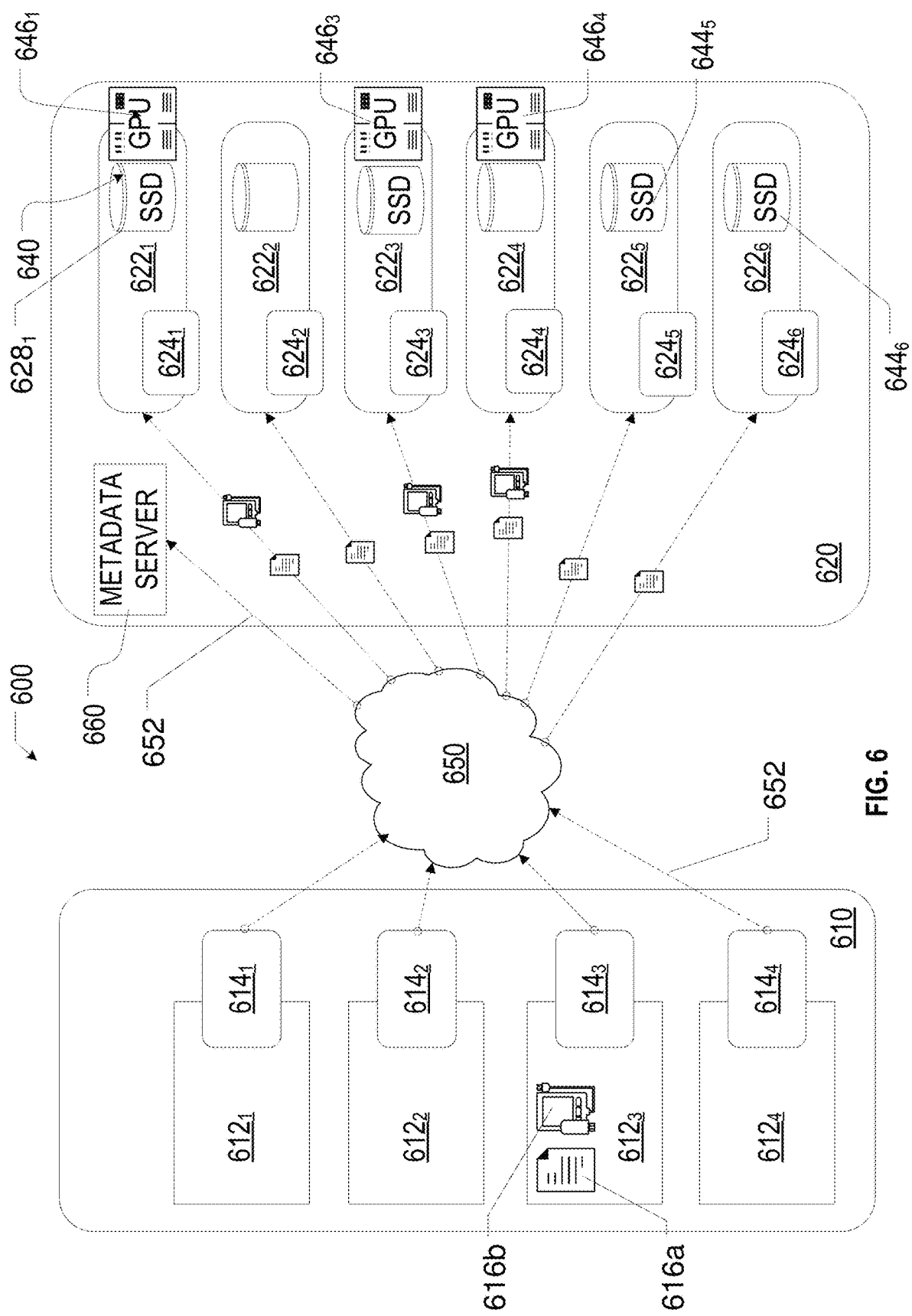
FIG. 6 depicts an example hybrid cloud environment, consistent with some embodiments.

FIG. 6 shows an example hybrid cloud environment 600 consistent with some embodiments. This hybrid cloud environment 600 comprises an on-premise cloud 610 and a remote cloud 620, such as a public cloud or redundancy cloud, that are in communication with each other via data flow paths 652 (only some labeled for clarity) in a network 650. The on-premise cloud 610 in some embodiments comprises a plurality of client nodes $612_{1-4}$, which in turn, comprise a distributed file system client $614_{1-4}$ (e.g., GPFS) containing local data 616a, 616b and a network file system client 616 (pNFS).

The remote cloud 620 in some embodiments comprises a plurality of client nodes $622_{1-6}$, which in turn, comprise a distributed file system client $624_{1-6}$ containing local data in local storage 628 (only one labeled for clarity). Some of the client nodes 622 in the remote cloud 620 include enhanced (e.g., special purpose) system resources 640, such as an upgraded processor, a solid state hard drive 644, a co-processor (such as graphical processing unit (GPU) 646), special memory types, and/or extra memory availability. Also associated with the hybrid cloud environment 600 is a metadata server 660. Those skilled in the art will appreciate that only some nodes 612, 622 and enhanced system resources 640 in FIG. 6 have been drawn and/or labeled for clarity.

As an illustrative example, the local data 616 in FIG. 6 comprises a PIC.JPG file 616a and a MEDIA.DTS file 616b. The MEDIA.DTS file 616b is a media type file, which benefits from special purpose hardware, and is being preferentially stored on data nodes $622_1$, $622_3$, and $622_4$ because those nodes have an associated GPU 646. The PIC.JPG file 616a is a general workload type file, which does not need enhanced hardware. It is being spread across the remote cloud 520 due to the round robin mechanism of the pNFS file system.

The metadata server 660 may be any system that stores the data structures needed for the underlying filesystem. In some embodiments, the metadata server 660 may store this information using the data structures described with reference to blocks 1010-1030. The metadata server may also contain the file-to-block layout mappings described with more detail with reference to FIG. 7. In some embodiments, the metadata server 660 may additionally function as a controller for the system. The controller function may be a software component that has two parts (master-client), where client part is situated at the target site and master is situated at parent site. The master part may then use the information collected at this information at blocks 1010-1040 (where the file-to-block layout is stored at the metadata server 660) and then pass/inject that information to a WAN caching daemon/algorithm, or the like, to selectively replicate the block layout to respective node(s). One advantage of these embodiments is they allow for use of different files and hardware resources over time, as can occur as artificial intelligence and machine learning workloads adapt and improve.

Figure 7:
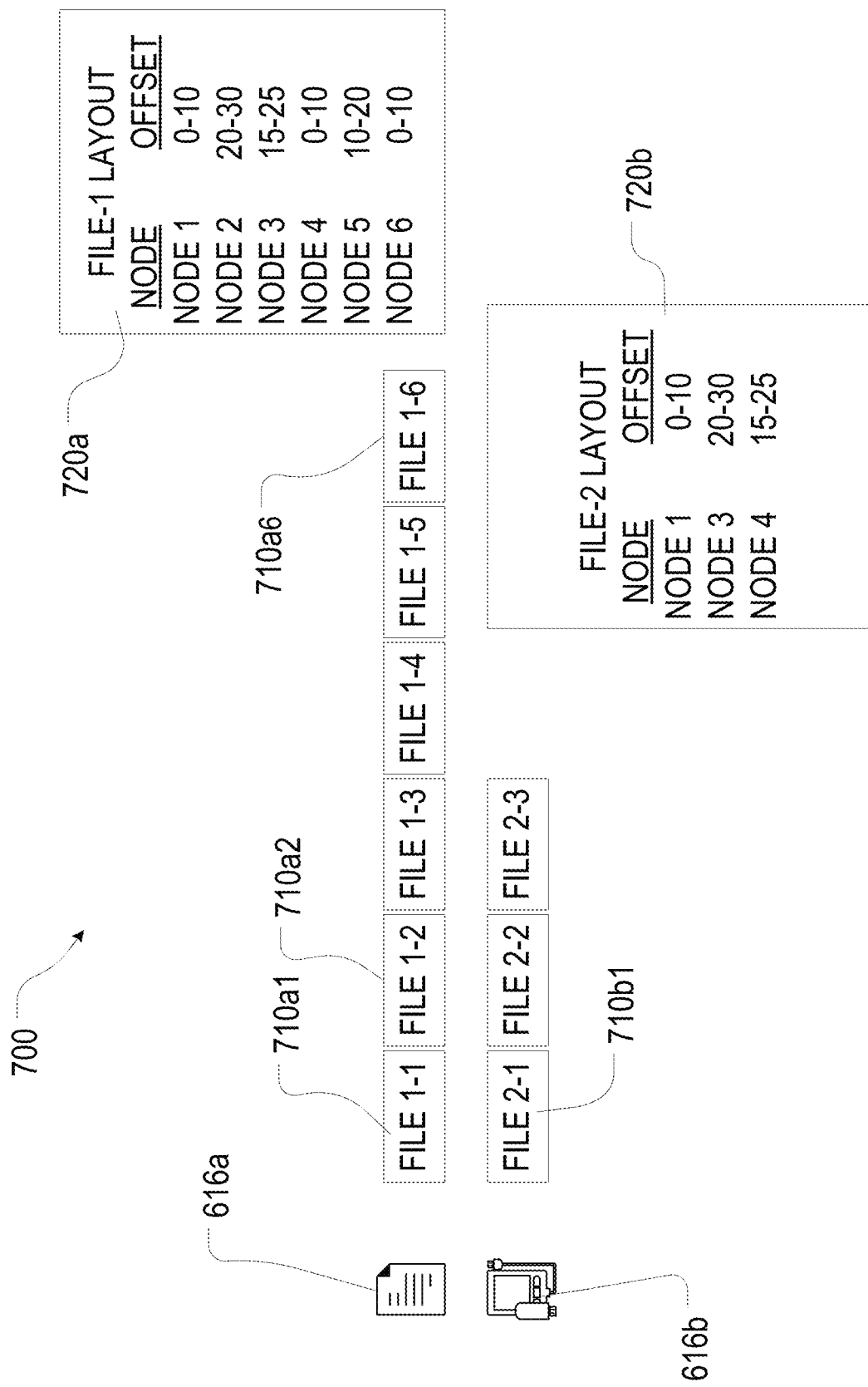
FIG. 7 depicts a block layout map for two examples files, consistent with some embodiments

FIG. 7 depicts a block layout map 700a, 700b for two examples files, PIC.JPG 616a and MEDIA.DTS 616b, consistent with some embodiments. In this block layout representation, both files 616a, 616b are split into a number of storage blocks 710 (only some labeled for clarity). As best shown in the file layouts 720a, 720b, the storage blocks 710a for the PIC.JPG file 616a are spread across client nodes $622_1$, $622_3$, and $622_3$ and mirrored across client nodes $622_4$, $622_5$, and $622_6$. The storage blocks 710b for the MEDIA.DTS file 616b, in contrast, are $622_1$, $622_3$, and $622_4$.

Figure 8:
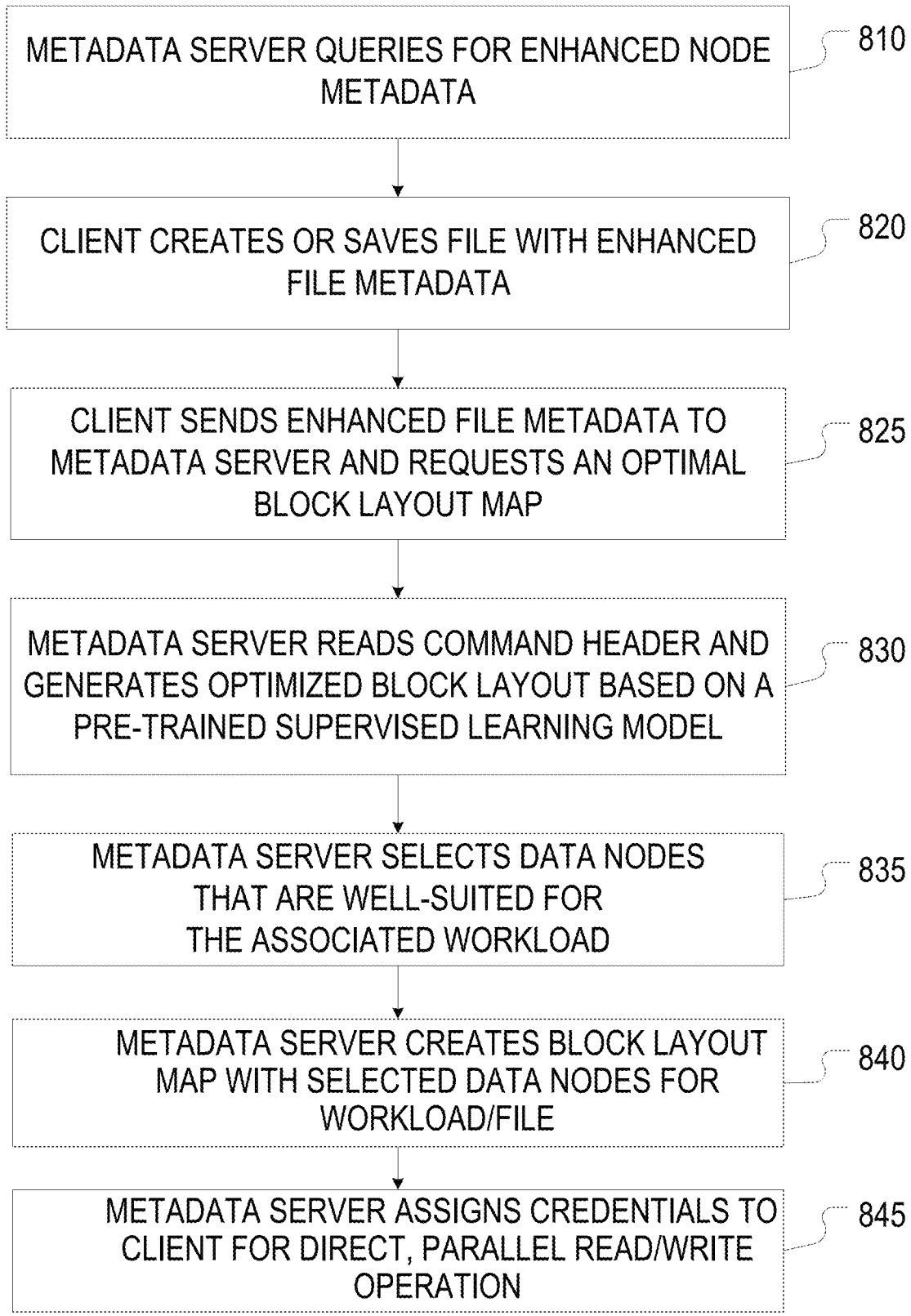
FIG. 8 depicts an example caching cluster file system in operation, consistent with some embodiments

FIG. 8 depicts an example caching cluster file system 600 in operation, consistent with some embodiments. As will be discussed in more detail with reference to FIG. 10, during an initialization phase at block 810, the metadata server 660 queries, or otherwise learns about, each node $612_{1-4}$, $622_{1-6}$ to determine enhanced metadata about that node's configuration, such as its available hardware resources (including any enhanced system resources 640), application software, operating system, and hypervisor configuration. The metadata server may then store that information in a database (not shown). At block 820, one of the local cloud nodes $612_i$ creates and saves a file $616_i$. This triggers its associated pNFS client 616i to create a SEND command with enhanced file metadata, such as a type of workload that generated the file, application performance requirements for that workload, a file type, a file size, and a data access pattern. The pNFS client $616_i$ sends this enhanced file metadata in a command header to metadata server 660 and requests an optimized block layout map for that file 616$_i$ from the metadata server 660 at block 825.

Figure 10:
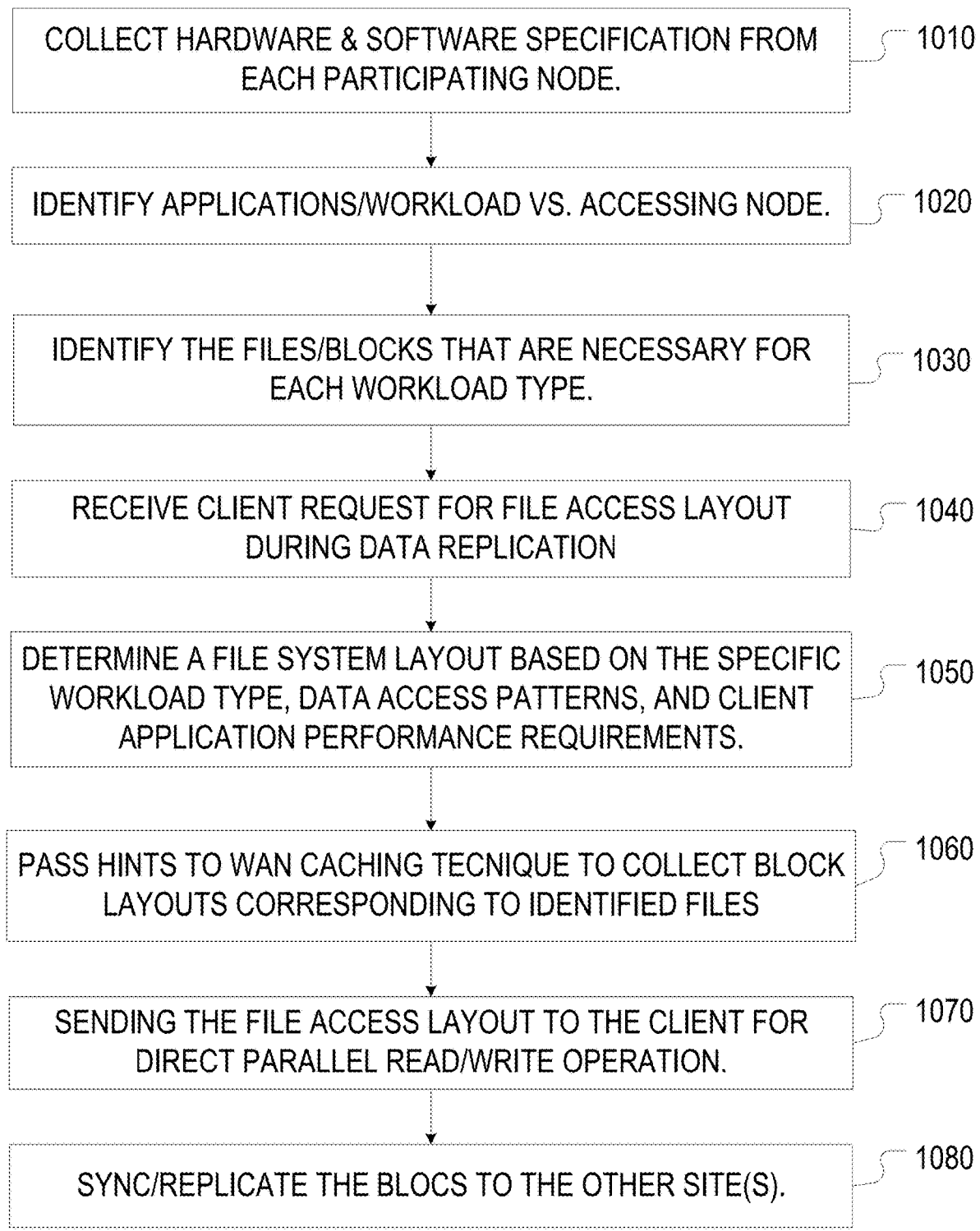
FIG. 10 illustrates one method of optimizing the block layout, consistent with some embodiments.

Next, at block 830, the metadata server 660 reads the command's header to identify the enhanced file metadata and presents that information, along with the enhanced node metadata collected at block 810, to a pre-trained supervised learning model (see FIG. 10). Based on the results of block 830, the metadata server 660 selects data nodes 622 that are well-suited for the associated workload at block 835. For example, "workload-1" for training a ML model may benefit from a GPU 646, so related data file(s) 616$i$ can be stored on data nodes which have GPU's 646. At block 840, the metadata server 660 creates a block layout map 700 (See FIG. 7) specifying which specific data node(s) 622 will store which specific file fragments. This block may also include mirroring those fragments for redundancy and/or improved read/write speed. At block 845, the metadata server 660 assigns credentials to the selected remote client(s) 622 to directly access (i.e., copy) the file data on the on-premise client(s) 612 according to the block layout map 700.

In some embodiments, in cases when on-premise client node 612 or remote client node 622 failure occurs, the metadata server 660 may trigger file data copy and/or erasure code reconstruction operation triggers to maintain the data redundancy. In such cases, the metadata server 660 can use the enhance file metadata to place the files 616a, 616b can be placed on new nodes having the same or similar hardware and software configuration (e.g., enhanced system resources 640) as original failed data node 612, 622. Some embodiments may also support reverse transfer in the event of a failure in data nodes 622. Similarly, in some embodiments, when new nodes 612, 622 having new and/or different enhanced system resources 640 or software, the metadata server 660 may periodically reposition the workload and associated files 616a, 616b.

Figure 9:
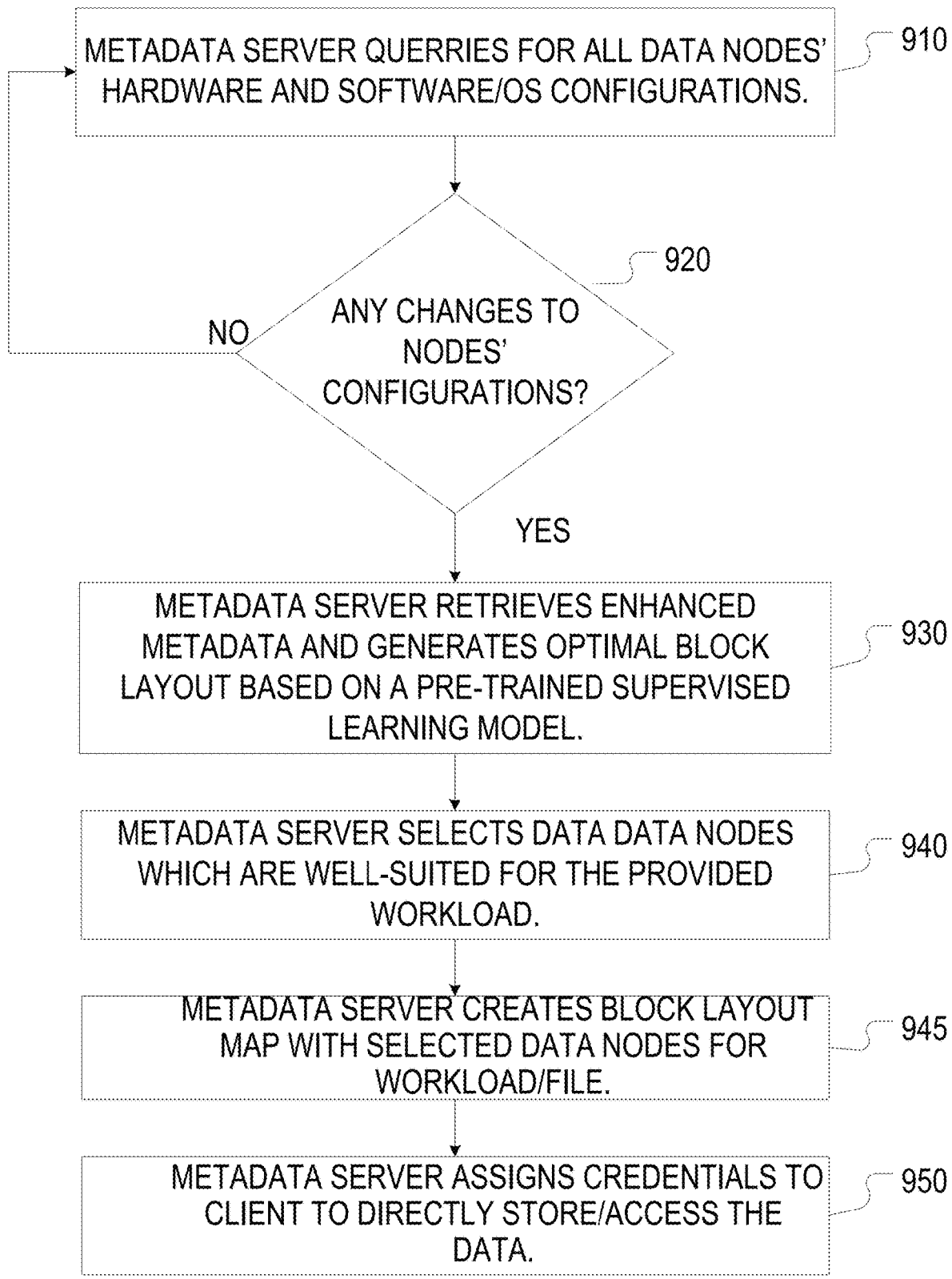
FIG. 9 illustrates one method of providing enhanced system resources fail-over, consistent with some embodiments.

FIG. 9 illustrates one method of providing enhanced system resources fail-over, consistent with some embodiments. At block 910, during an initialization phase, the metadata server 660 queries, or otherwise learns about, each node 612$_{1-4}$, 622$_{1-6}$ to determine that node's system metadata, such as available hardware resources, software/OS/hypervisor configuration, and storage size, and then stores that information in a database (not shown). At block 920, the metadata server 660 determines whether there have been any change in any node's 612, 622 configuration. If so, the metadata server 660 searches the database to identify the enhanced file metadata for any workloads and/or files on that node 612, 622 at block 930, then re-presents that information to its pre-trained supervised learning model at block 935. At block 940-945, the metadata server 660 creates a new block layout map 700 with selected data node(s) 622 for the workload(s) and file(s) 622. At block 950, metadata server 660 the assigns credentials to the selected remote client(s) 622 to directly store/access the data on the on-premise client(s) 612.

FIG. 10 illustrates one method of optimizing the block layout, consistent with some embodiments. At block 1010, a scheduler component of the metadata node 660 may collect and store the hardware and software specifications from each node participating in the clusters per site. One suitable data structure embodiment is shown in CODE EXAMPLE 1:

```
{
  "site-1":
  {
      "node-1": {"cpu_cores": "8", "asic": "enabled", "gpu": "disabled", "drives": "hdd"},
      "node-2": {"cpu_cores": "2", "asic": "disabled", "gpu": "disabled", "drives": "SDD"},
  },
  "site-2":
  {
      "node-1": {"cpu_cores": "8", "asic": "enabled", "gpu": "disabled", "drives": "Near-Line SAS"},
      "node-2": {"cpu_cores": "2", "asic": "enabled", "AES": "enabled", "gpu": "enabled", "drives": "SAS"
  }
}
```

Code Example 1

At block 1020, the scheduler component of the metadata node 550 may identify applications/workload vs. accessing node, and may store the information in a suitable data structure. One suitable data structure embodiment is shown in CODE EXAMPLE 2:

```
{
  "site-1":
  {
    "node-1": "storage"},
    "node-2": {"NAS-sharing"},
    "node-3": "encryption"}
  },
  "site-2":
  {
    "node-1": "Video processing"
    "node-2": "storage",
    "node-3": "NAS-sharing",
    "node-4": "encryption",
    "node-5": "transactional"
  }
}
```

Code Example 2

At block 1030, the scheduler component of the metadata node 550 may identify and store metadata about the files/blocks that are necessary for each workload type. The identification is dependent on file type and historical usage data by an application. An example is shown in CODE EXAMPLE 3:

```
{
  "storage": ["file-1", "file-3", "file-4"],
  "NAS-sharing": ["file-10", "file-11", "file-40"],
  "encryption": ["file-2", "file-1", "file-8"],
  "transactional": ["file-11", "file-3", "file-4"]
}
```

Code Example 3

The system then waits for a client to request a file access layout, such as for a data replication operation, at block

1040, which may include a handle or uniform resource locator for the file, and may include metadata about the specific workload type, data access patters, and client application performance requirement associated with the file. In response to a request, the system determines at block 1050 a file system layout for the parallel file access protocol to use based on the specific workload type, data access patters, and client application performance requirement included in the client request from the primary site. In some embodiments, this may include matching the metadata from the client request against the information collected at blocks 1010-1030. Based on this matching of identification of the files vs. workload type vs. target site node hardware spec used for the workload category, the system may then pass hints to WAN caching techniques to collect the block layouts corresponding to identified files at block 1060 and then sync/replicate the blocks to other site(s) at block 1070. In some embodiments, whole blocks may be replicated at block 1070 in the initial case. In later cases, incremental block changes may be replicated.

Computer Program Product

Although the present invention has been described in detail with reference to certain examples thereof, it may be also embodied in other specific forms without departing from the essential spirit or attributes thereof. For example, the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

Aspects of the present invention were described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A method for storing blocks of a file in a heterogeneous environment, comprising:
  receiving a command header for an operation associated with a file from a first data node, wherein the command header includes enhanced metadata associated with a file, wherein the enhanced metadata comprises a type of workload that generated the file and a data access pattern;
  matching the enhanced metadata with capabilities of a second data node; and
  generating a block layout map for the file based at least in part on the enhanced metadata and the capabilities of the second data node.

2. The method of claim 1, further comprising;
  identifying a current hardware configuration of the second node; and
  dynamically updating the current hardware configuration to a metadata node.

3. The method of claim 2, further comprising assigning credentials to the second data node to access the file at the first data node.

4. The method of claim 3, further comprising passing the enhanced metadata to a WAN caching daemon to selectively replicate a block layout for the file to the second data node.

5. The method of claim 2, comprising:
  identifying a data migration event between the first data node and the second data node; and
  dynamically placing the file based on an associated workload's benefit to a hardware configuration.

6. The method of claim 1, wherein the capabilities of the second data node are chosen from the group consisting of a graphical processing unit and a solid state drive.

7. The method of claim 1, wherein the enhanced metadata further comprises a type of workload that generated the file, a file type, and a file size.

8. The method of claim 1, wherein the first data node is associated with a local cloud and the second data node is associated with a remote cloud.

9. The method of claim 8, wherein the remote cloud comprises heterogenous hardware and software configurations.

10. The method of claim 1, further comprising detecting a node failure event; and transferring the file from the second node to the first node.

11. The method of claim 1, further comprising wherein the enhanced metadata further comprises an application workload performance requirement.

12. A computer-implemented method for automatically selecting a data node in a distributed storage network based on data replication request, comprising;
  identifying a current hardware configuration of a data node, the hardware configuration including a memory type, a memory amount, a storage type, and available coprocessors;
  dynamically updating a metadata nodes with the current hardware configuration;
  receiving credentials for a remote data node to read a local file, wherein the remote data node is selected based at least in part a workload hardware configuration requirement associated with the file; and
  writing the file to the remote data node.

13. The method of claim 12, wherein the workload hardware configuration requirement comprises a co-processing unit.

14. The method of claim 12, wherein the workload hardware configuration requirement comprises a solid state drive.

15. The method of claim 12, wherein the data node is associated with a remote cloud.

16. The method of claim 15, wherein the remote cloud comprises heterogenous hardware and software configurations.

17. A distributed cluster file system, comprising:
- a first plurality of data nodes associated with a local cloud;
- a second plurality of data nodes associated with a remote cloud; and
- a metadata server adapted to:
  - receive a command header for an operation associated with a file from one of the first plurality of data nodes, wherein the command header includes enhanced metadata associated with a file, wherein the enhanced metadata comprises a type of workload that generated the file and a data access pattern;
  - match the enhanced metadata with capabilities of one or more of the second plurality of data nodes; and
  - generate a block layout map for the file based at least in part on the enhanced metadata and the capabilities of the second data node.

18. The system of claim 17, further comprising a processor coupled to a memory, the memory containing instructions for the metadata server.

19. The system of claim 17, further comprising a plurality of distributed file system clients, wherein one of the plurality of distributed file system clients is associated with each of the first plurality of data nodes and the second plurality of data nodes.

20. The system of claim 17, wherein the remote cloud comprises heterogenous hardware and software configurations.

* * * * *